United States Patent [19]
Schmoll

[11] 3,973,595
[45] Aug. 10, 1976

[54] ARRANGEMENT FOR ACTUATING MECHANICALLY INDEPENDENT VALVES IN A PRESSURE FLUID SYSTEM

[75] Inventor: Heinz Schmoll, Heide, Germany

[73] Assignee: Schloemann-Siemag Aktiengesellschaft, Dusseldorf, Germany

[22] Filed: Dec. 12, 1974

[21] Appl. No.: 531,969

[30] Foreign Application Priority Data
Dec. 15, 1973  Germany............................ 2362431

[52] U.S. Cl................................ 137/637.1; 91/449; 91/454; 91/461; 137/596.15; 137/596.16
[51] Int. Cl.²................... F15B 13/043; F15B 20/00
[58] Field of Search............ 91/449, 454, 459, 461; 137/596.14, 596.15, 596.16, 637.1

[56] References Cited
UNITED STATES PATENTS

| | | | |
|---|---|---|---|
| 2,471,320 | 5/1949 | Gilson | 91/454 X |
| 2,994,303 | 8/1961 | Robra et al. | 91/454 X |
| 3,289,701 | 12/1966 | Booth et al. | 137/637.1 |
| 3,856,037 | 12/1974 | Garrett | 137/637.1 X |

*Primary Examiner*—Alan Cohan
*Assistant Examiner*—Gerald A. Michalsky
*Attorney, Agent, or Firm*—Holman & Stern

[57] ABSTRACT

A hydraulic interlock arrangement for ensuring that an inlet valve is closed before a discharge valve is opened, and vice versa, each inlet or discharge valve having a hydraulic piston-cylinder unit for actuating the same, a hydraulic pilot valve for operating the piston-cylinder unit and a blocking member for preventing actuation of the pilot valve, the first blocking member being connected to the pressure chamber of the second piston-cylinder unit, and vice versa, so that when the pressure chamber in one piston-cylinder unit is under pressure, the pilot valve of the other piston-cylinder unit cannot be actuated.

3 Claims, 2 Drawing Figures

3,973,595

ARRANGEMENT FOR ACTUATING MECHANICALLY INDEPENDENT VALVES IN A PRESSURE FLUID SYSTEM

BACKGROUND OF THE INVENTION

The present invention relates to an arrangement for actuating at least first and second mechanically independent valves in a hydraulic system and for providing a pressure fluid interlock to ensure that one of the valves is fully closed before the other is opened, the arrangement comprising first and second pressure-fluid piston-cylinder actuator units for actuating the first and second valves of the pressure fluid system and first and second electromagnetically-actuated pilot valves for controlling the operation of the first and second piston-cylinder units. The invention also relates to a hydraulic system comprising the first and second valves and the arrangement of the invention, and also a machine, such as for instance a hydraulic press, comprising a hydraulic piston-cylinder unit controlled by the system of the invention.

There are hydraulic systems in which water is used as the pressure fluid and in which the necessary interlock is provided by control devices which can act in various ways, namely mechanically, or electro-hydraulically using the hydraulic fluid which is also used for the hydraulic piston-cylinder units, or electro-hydraulically using a different hydraulic fluid or electro-pneumatically using compressed air.

In general, the hydraulic systems with which the invention is concerned will be systems in which hydraulic pressure can be obtained either from a direct pump connection of from one or more pressure accumulators.

To control the hydraulic piston-cylinder unit in a machine such as a hydraulic press, at least two valves are required in practice, and for practical reasons, these valves are normally mechanically independent, but their opening and closing movements are coordinated or interlocked. Interlocking is important, particularly when using a pressure accumulator; in this case, the discharge valve must be closed before the inlet valve is opened, and the inlet valve must be closed before the discharge valve is opened, in order to prevent any loss of hydraulic fluid during change-over. If this interlock procedure is not followed, both valves are open at the same during the change-over procedure. The hydraulic fluid then flows direct from the inlet valve to the discharge valve and is not used, resulting to a substantial loss of energy during successive change-over operations.

German Patent Specification No. 1 269 457 and German Offenlegungsschrift No. 1 402 525 disclose control arrangements for providing the interlock of mechanically-independent valves in servomotors. The interlock of the first and second piston-cylinder actuator units is effected by providing slot or port control of the pistons of the units. With this type of control, even if hydraulic control pulses are transmitted simultaneously to the pilot valves via the slots or ports, the piston-cylinder units are controlled in such a way that one valve cannot be opened until the other valve has been closed.

In general, this method of interlock by slot or port control is very reliable in practice. However, a succession of faulty electrical control signals to the pilot valves can destroy the interlock effect. For instance, if an incorrect electrical signal to open the discharge valve is given while the inlet valve is still open, oil will leak from one port of the piston-cylinder unit actuating the inlet valve to the other port, between the cylinder wall and the piston. Since the pilot valve controlling the discharge valve has been actuated magnetically to open the discharge valve, the oil leaking from the piston of the inlet valve can now gradually pass through the open pilot valve to the associated piston which actuates the discharge valve, and cause the latter piston to open the discharge valve. In this way, the discharge valve is opened, although the inlet valve has not completely closed.

THE INVENTION

Thus in accordance with the invention, that cylinder chamber which causes the first mechanically-independent valve to open is in fluid communication with a blocking member which blocks the actuation of the pilot valve of the second mechanically-independent valve until said cylinder chamber is no longer under substantial pressure, and vice versa. In this way, a positive and reliable interlock is provided, and the interlock effect can be permanently retained even if a succession of faulty electrical control signals is sent to the electromagnetically-actuated pilot valves. For example, if a solenoid of the first pilot valve is excited, it will apply fluid pressure to the first piston-cylinder unit in order to open the first mechanically-independent valve, and at the same time apply fluid pressure to the second blocking member, thus blocking the second pilot valve. When the solenoid of the first pilot valve is de-energised, the piston of the first piston-cylinder unit will return to its start position, but there will be fluid pressure built up behind the piston so that the second blocking member will delay actuation of the second pilot valve, even if its solenoid is excited, until the fluid pressure beneath the first piston has subsided on the termination of the retraction of the first piston and closure of the first valve. This build-up of fluid pressure can be sustained additionally by incorporating restrictors or adjustable throttle valves between chambers of the respective piston-cylinder units and the respective pilot valves.

It will be seen that although the interlock arrangement of the invention is effective, it can be constructed in a simple manner.

The arrangement of the invention can be used to control more than two valves. For instance, if there is a third mechanically-independent valve in addition to the first and second valves, the arrangement can further comprise a third piston-cylinder actuator unit, a third electromagnetically-actuated pilot valve and a third blocking member, the third blocking member being for preventing actuation of the third pilot valve and being in fluid communication with said chamber of the first piston-cylinder unit while the first blocking member is in fluid communication with said chamber of the third piston-unit by way of a one-way valve which prevents flow of pressure fluid in the direction from said chamber of the second piston-cylinder unit to said chamber of the third piston-cylinder unit. In this way, the blocking member of the first pilot valve keeps the first pilot valve blocked, and thus keeps the first mechanically-independent valve closed, without subjecting the piston of the piston-cylinder unit of the third valve to the fluid pressure in said chamber of the second valve and in the line connecting said chamber of the second valve to the first blocking member; this situation can occur even when the correct sequence of electrical excitation of the pilot valves is followed, during the interval between the initiation of the closing of the third valve up to the final closure of the third valve and the moment when the piston of the third piston-cylinder unit reaches its final retracted position.

The interlock arrangement of the invention is preferably designed for use with a hydraulic pressure fluid, suitably oil, but this is not essential as it could be designed for use with compressed air.

BRIEF DESCRIPTION OF THE DRAWING

An embodiment of the invention is now particularly described, by way of example, with reference to the accompanying drawings, in which.

DETAILED DESCRIPTION OF ONE EMBODIMENT

Figure 1:
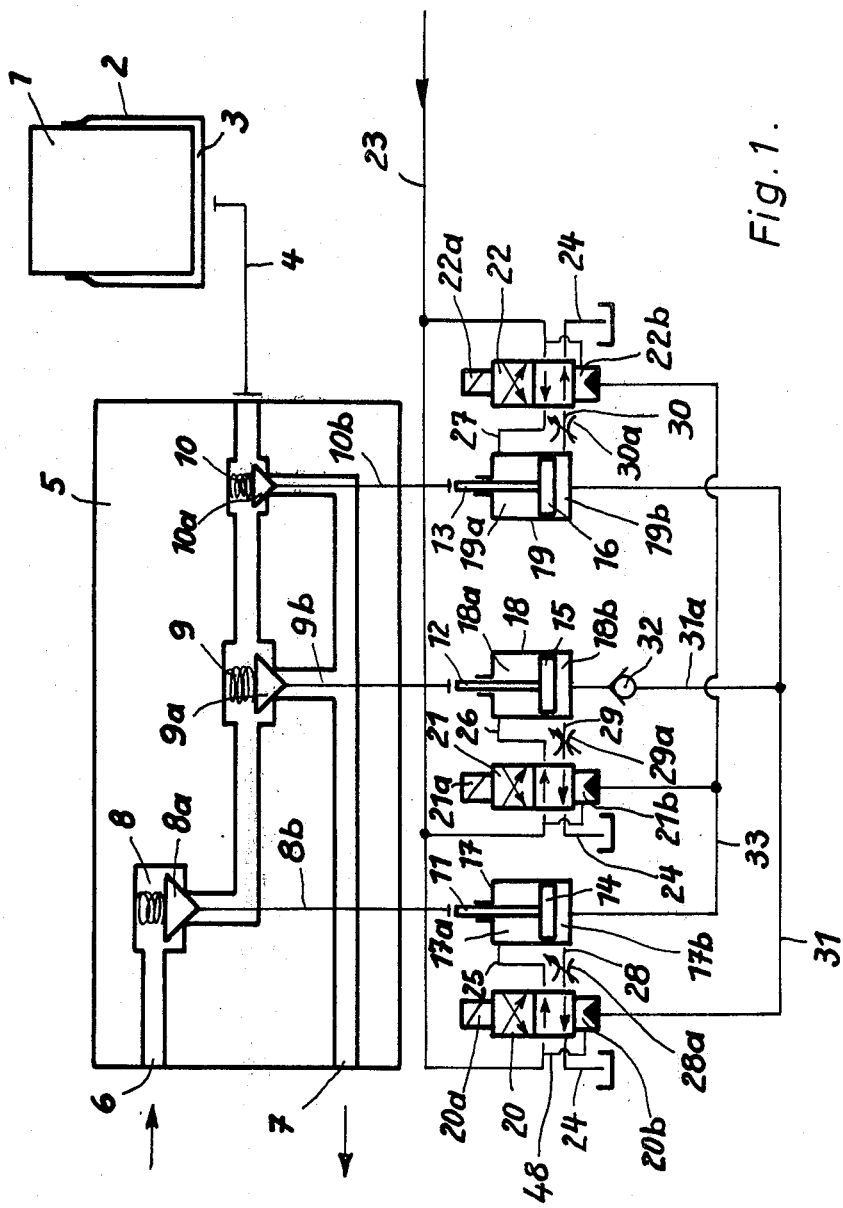
FIG. 1 is a diagrammatic representation of a machine having a pressure-fluid system and interlock arrangement in accordance with the invention.

A working piston 1 of the machine (which may be a hydraulic forging press) slides in a working cylinder 2. A cylinder space 3 below the working piston 1 is connected by a line 4 with a valve housing 5. A piston cylinder unit 1, 2 can be actuated using water as hydraulic fluid. The valve housing is not described in detail, but a suitable valve housing is shown in U.S. Pat. No. 3,138,976 or British patent specification No. 363,356. The valve housing 5 includes aa pressurised water inlet 6 and an outlet 7. The housing 5 contains a water inlet valve 8, a large flow cross-section water discharged valve 9 and a small flow cross-section water discharge valve 10 — these are the first, third and second mechanically-independent valves referred to above, and all the valves are sprung into their closed positions.

The actual movable valve members 8a, 9a and 10a of the respective water valves 8, 9 and 10 are connected to push rods 8b, 9b and 10b. These push rods 8b, 9b and 10b can abut the ends of piston rods 11, 12 and 13 of respective reciprocating lifting pistons 14, 15 and 16 which are not within the valve housing 5. These pistons 14, 15 and 16 slide in respective lifting cylinders 17, 18 and 19 and are arranged to be subjected to oil under pressure. Pilot valves 20, 21 and 22, which are 4/2 directional control spool valves, are hydraulically connected to the respective piston-cylinder units 14/17, 15/18 and 16/19.

A control pressure line 23 (for supplying oil under pressure) leads to each of the pilot valves 20, 21 and 22. An oil discharge duct or line 24 is provided for each pilot valve 20, 21 and 22. Ducts or lines 25, 26 and 27 connect the pilot valves 20, 21 and 22 to the respective upper cylinder chambers 17a, 18a and 19a of the cylinders 17, 18 and 19. When pressurized oil is admitted to these upper cylinder chambers, the pistons 14, 15 and 16 move downwards to permit closing of the respective water valves 8, 9 and 10. Ducts or lines 28, 29 and 30 connect the respective pilot valves 20, 21 and 22 with the lower cylinder chambers 17b, 18b and 19b of the cylinders 17, 18 and 19. The ducts or lines 28, 29 and 30 are provided with respective throttle passages or restrictors 28a, 29a and 30a, which may be adjustable.

The pilot valves 20, 21 and 22 are adapted to be controlled by means of respective electrically-excited solenoids 20a, 21a and 22a. Blocking pistons 20b, 21b and 22b are mounted on the respective pilot valves 20, 21 and 22 and are adapted to be subjected to oil pressure so as to act in opposition to the solenoids. The blocking piston 20b is connected via an interlocking line 31 and a branch line 31a with the lower cylinder chambers 18b and 19b, the pressure in which acts to open the water valves 9 and 10 respectively. A non-return valve or check valve 32 is mounted in the line 31a which is connected to the lower chamber 18b of the cylinder 18.

A further interlocking line 33 connects the lower chamber 17b of the cylinder 17 with the blocking pistons 21b and 22b. In the absence of oil pressure applied thereto, the blocking pistons 20b, 21b and 22b are retracted into their position of rest either hydraulically or by springs which also act as return springs for the spools of the pilot valves 20, 21 and 22. When the blocking pistons 20b, 21b and 22b are subjected to oil pressure, they prevent any displacement of the pilot valve spools, even when the solenoids are excited, since the force the blocking pistons exert is greater than the opposing magnetic force.

Figure 2:
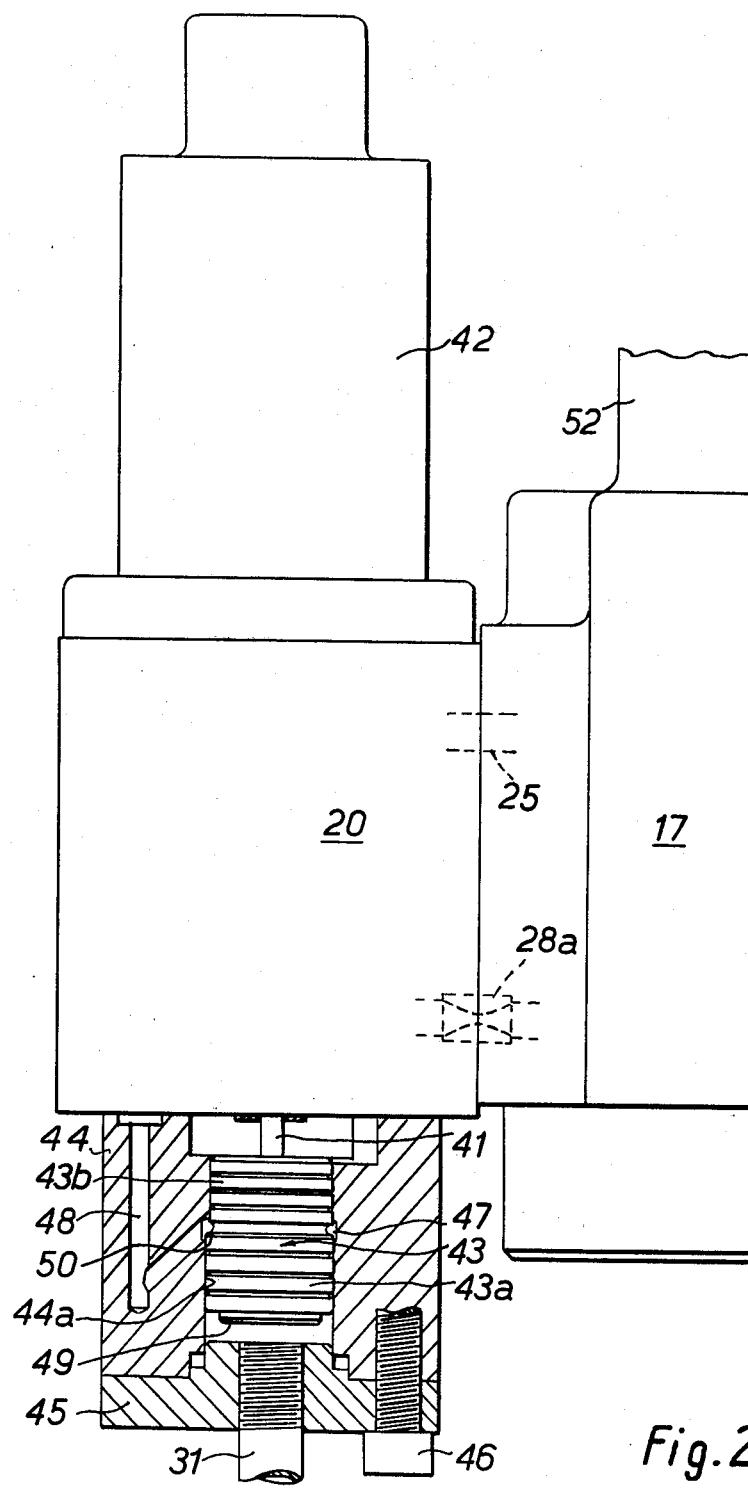
FIG. 2 is a detailed view of a fluid valve and blocking piston in the machine of FIG. 1.

The assembly shown in FIG. 2 is duplicated three times in the system shown in FIG. 1, at 20, 17; 21, 18; 22, 19. The reference numbers now used in FIG. 2 are taken from the left-hand assembly of FIG. 1 (20, 17).

Two thirds of the pilot valve 20 are conventional and have therefore not been sectioned. The valve operates by movement of a valve spool or member 41 along an axis which is vertical as seen in FIG. 2. A housing 42 contains the electrically-excited solenoid 20a which is conventionally connected in an electrical circuit, and has an axially movable armature at its centre which can bear on an upper end of the valve member 41, to bias the valve member 41 downwards. The upper end of the valve member 41 is similar to the lower end, which is shown. This is a conventional means for operating such a valve. The central body of the valve 20 is also conventional and contains the valve member, the respective valve seating parts and the fluid inlets and outlets, and may be of the same construction for instance as a Rexroth Type WE 10 spool valve.

As the bottom of the valve 20, the blocking piston 20b is arranged in a bore 44a of a cylinder block 44 fixed to the housing 20. The cylinder bore is closed by a cover 45, screwed to the block 44 by screws 46 (one of which is visible in FIG. 2), and this cover 45 also receives the end of the interlocking line 31. The blocking piston 20b is double-acting; pressurised oil can also be admitted to a cylinder space 47 through a passage 48 which is in communication with the control pressure line 23, and thus is always maintained at a constant pressure. It can be seen that the lower part 43a of the blocking piston 20b is of a larger diameter than the upper part 43b, so the pressure in space 47 will always tend to bias the piston 43 downwards.

As can be seen from FIG. 1, the pilot valve 20 and lifting cylinder 17 are connected by ducts 25 and 28. In practice, the housings of valve 20 and cylinder 17 are in contact, and the ducts 25, 28 comprise respective adjoining bores in the adjoining housing walls, as indicated in FIG. 2. The duct 28 contains the restrictor 28a, and this restrictor comprises a pipe of smaller bore diameter screwed into the duct 28 in the housing of the pilot valve 20 or of the lifting cylinder 17, or partly in both. If the valve 20 and the cylinder 17 are separated, this pipe can be screwed out and replaced by one of a different bore diameter, thus providing adjustability.

When an upward force is applied to the valve member 41 by the blocking piston 20b, this is always sufficient to overcome the downward force generated by the solenoid 42, should this happen to be acting at the same time. The upward force acting on the blocking piston 20b, derived from the fluid entering through line 31 and acting on the base 49 of the piston, is at the same time sufficient to overcome downward pressure exerted by fluid in the passage 48 on the shoulder 50 of the piston. However, when the interlocking line 31 is not pressurised, the blocking piston 20b will be depressed by the pressure in space 47.

The annular recesses around the blocking piston 20b are conventionally used in hydraulic systems to help prevent hydraulic fluid from escaping along the piston walls.

The lifting cylinder 17 is entirely a conventional construction. The lifting piston 14 is double-acting and moves in a cylinder chamber, and the ducts 25, 28 lead into this chamber, one on either side of the piston 14. In FIG. 2, a housing part 52 conceals the piston rod 11 from view.

Those parts of the interlock arrangement which have not been described in detail can be constructed using standard components in accordance with the German Industrial Standard DIN 24300.

Operation of the embodiment

The following requirements have to be met:

1. The water inlet valve 8 must not open until the water discharge valves 9 and 10 have closed, for admission of water under pressure to the surface of the working piston 1;
2. The water discharge valves 9 and 10 must open together, after the inlet valve 8 has closed, for full-rate discharge of water from below the working piston 1, i.e. rapid retraction of the working piston 1;
3. The water discharge valve 9 must be able to close whilst the water discharge valve 10 remains open and the water inlet valve 8 remains closed, for throttled-down discharge of water from below the working piston 1, i.e. slow retraction of the working piston 1.

Rest Position of the Arrangement

The solenoids 20a, 21a and 22a of all the pilot valves 20, 21 and 22 are de-energized. Owing to the action of the pilot valves (which will be in the positions shown in the drawing), all the pistons 14, 15 and 16 are retracted and all the water valves 8, 9 and 10 are closed.

Operative Position of the Arrangement

When the solenoid 20a of the pilot valve 20 is excited, the lower cylinder chamber 17b is subjected to oil pressure and the piston 14 is caused to move and open the water inlet valve 8, whilst oil is discharged from the upper cylinder chamber 17a. The inlet valve 8 is therefore opened by the piston 14. Substantially simultaneously with the admission of pressurized oil to the lower cylinder chamber 17b, the blocking pistons 21b and 22b of the pilot valves 21 and 22 are subject to oil pressure via the line 33, thus preventing actuation of the pilot valves 21 and 22. This prevents the admission of pressurized oil to the lower cylinder chambers 18b and 19b and in turn prevents the water discharge valves 9 and 10 opening.

Rapid Retraction

The solenoid 20a of the pilot valve 20, which is associated with reciprocating piston 14 and consequently with the water inlet valve 8, is de-energised. Owing to the quicker changeover sequence and less complicated electrical circuitry, the control currents for the valve solenoids are preferably supplied simultaneously. Thus, at the same time, the solenoids 21a and 22a of the respective pilot valves 21 and 22, which are associated with the pistons 15 and 16 and consequently with the water discharge valves 9 and 10, are excited.

If the throttle valve 28a be suitably adjusted, there is a certain oil presssure in the lower cylinder chamber 17b when the piston 14 is moved downwards at a controlled rate, this pressure being transmitted to the blocking pistons 21b and 22b, thus preventing the associated pilot valves 21 and 22 being actuated, which prevents the pistons 15 upon 16 opening the respective water discharge valves 9 and 10.

It is only when the piston 14 comes to the end of its stroke that the oil pressure transmitted via line 33 to the blocking pistons 21b and 22b collapses. The magnetic force of the solenoids 21a and 22a is now able to operate the spools of the pilot valves 21 and 22, causing oil pressure to act upon the pistons 15 and 16, thus opening the water discharge valves 9 and 10. The oil pressure acting beneath the reciprocating pistons 15 and 16 is now transmitted via line 31 to the blocking piston 20b so that the interlocking effect is now exerted on the pilot valve 20, thus preventing piston 14 opening the water inlet valve 8.

Slow Retraction

When the solenoid 21a of the pilot valve 21, which controls the discharge valve 9 via piston 15, is de-energised, the piston 15 is caused to return to its bottom position and the water discharge valve 9 closes. Due to the presence of the non-return valve 32 in the line 31a, the oil pressure remaining in the line 31 is caused to act on the blocking piston 20b of the pilot valve 20; this prevents magnetic actuation of the pilot valve 20 until the working piston 16 is fully retracted, and also ensures proper slow motion retraction of the working piston 1.

I claim:

1. An arrangement for actuating at least first and second mechanically-independent valves in a hydraulic system and for providing a pressure-fluid interlock to ensure that one of the valves is fully closed before the other valve is opened, the arrangement comprising: first and second pressure-fluid piston-cylinder actuator units for actuating said first and second mechanically-independent valves, respectively, each said piston-cylinder unit having a cylinder chamber which, upon pressurization, causes the respective said mechanically-independent valve to open; first and second electromagnetically-actuated pilot valves for controlling the operation of said first and second piston-cylinder units, respectively; first and second pressure-fluid actuated blocking members for preventing the actuation of said first and second pilot valves, respectively; first fluid duct means interconnecting said first pilot valve and said chamber of said first piston-cylinder unit; second fluid duct means interconnecting said second pilot valve and said chamber of said second piston-cylinder unit; first control fluid duct means interconnecting said first blocking member and said chamber of said second piston-cylinder unit; and second control fluid duct means interconnecting said second blocking member and said chamber of said first piston-cylinder unit; whereby when said chamber of said second or first piston-cylinder unit is under substantial pressure, said first or second pilot valve respectively cannot be actuated to open said first or second mechanically-independent valve respectively in said hydraulic system, said hydraulic system further comprising a third mechanically-independent valve in addition to said first and second mechanically-independent valves, the arrangement further comprising: a third pressure-fluid piston-cylinder actuator unit for actuating said third mechanically-independent valve; a third electromagnetically-actuated pilot valve for controlling the operation of said third piston-cylinder unit; a third blocking member for preventing actuation of said third valve; third control fluid duct means interconnecting said third blocking member and said chamber of said first piston-cylinder unit; and further control fluid duct means interconnecting said first blocking member and said chamber of said third piston-cylinder unit, said further control fluid duct means incorporating a check valve preventing flow of pressure fluid through said check valve towards said chamber of said third piston-cylinder unit.

2. The arrangement of claim 1, wherein said blocking members are blocking pistons directly opposing magnetic force electromagnetically actuating said pilot valves.

3. A hydraulic system for controlling a machine which comprises a hydraulic working piston-cylinder unit, said system comprising: a first, hydraulic fluid inlet valve including means for supplying hydraulic fluid to said working piston-cylinder unit; a second, hydraulic fluid discharge valve including means for discharging hydraulic fluid from said working piston-cylinder unit, said second valve being mechanically independent of said first valve; and an arrangement for actuating said first and second mechanically-independent valves and for providing a pressure-fluid interlock to ensure that one of said mechanically-independent valves is fully closed before the other said mechanically-independent valve is opened, said arrangement comprising: first and second pressure-fluid piston-cylinder actuator units for actuating said first and second mechanically-independent valves, respectively, each said piston-cylinder unit having a cylinder chamber which, upon pressurization, causes the respective said mechanically-independent valve to open; first and second electromagnetically-actuated pilot valves for controlling the operation of said first and second piston-cylinder units, respectively; first and second pressure-fluid actuated blocking members for preventing the actuation of said first and second pilot valves, respectively; first fluid duct means interconnecting said first pilot valve and said chamber of said first piston-cylinder unit; second fluid duct means interconnecting said second pilot valve and said chamber of said second piston-cylinder unit; first control fluid duct means interconnecting said first blocking member and said chamber of said second piston-cylinder unit; and second control fluid duct means interconnecting said second blocking member and said chamber of said first piston-cylinder unit; whereby when said chamber of said second or first piston-cylinder actuator unit is under substantial pressure, said first or second pilot valve respectively cannot be actuated to open said first or second mechanically-independent valve respectively in said hydraulic system, further comprising: a third, hydraulic fluid discharge valve for discharging said hydraulic fluid from said working piston-cylinder unit, said third valve being mechanically independent of said first and second mechanically-indepentent valves, said second mechanically-independent valve being a small flow cross-section valve, for slow release of said hydraulic fluid from said working piston-cylinder unit and thereby slow retraction of said working piston-cylinder unit, and said third mechanically-independent valve being a large flow cross-section valve for rapid release of said hydraulic fluid from said working piston-cylinder unit and thereby rapid retraction of said working piston-cylinder unit; a third pressure-fluid piston-cylinder actuator unit for actuating said third mechanically-independent valve; a third electromagnetically-actuated pilot valve for controlling the operation of said third piston-cylinder unit; a third blocking member for preventing actuation of said third pilot valve; third control fluid duct means interconnecting said third blocking member and said chamber of said first piston-cylinder unit; and further control fluid duct means interconnecting said first blocking member and said chamber of said third piston-cylinder unit, said further control fluid duct means incorporating a check valve preventing flow of pressure fluid through said check valve towards said chamber of said third piston-cylinder unit.

* * * * *